United States Patent
Ross et al.

(10) Patent No.: US 9,261,616 B2
(45) Date of Patent: Feb. 16, 2016

(54) DISPERSION ESTIMATION BY NONLINEAR OPTIMIZATION OF BEAM-FORMED FIELDS

(75) Inventors: Warren S. Ross, Houston, TX (US); Sunwoong Lee, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 923 days.

(21) Appl. No.: 13/469,964

(22) Filed: May 11, 2012

(65) Prior Publication Data

US 2012/0330554 A1  Dec. 27, 2012

Related U.S. Application Data

(60) Provisional application No. 61/499,546, filed on Jun. 21, 2011.

(51) Int. Cl.
*G01V 1/30* (2006.01)
*G06F 17/14* (2006.01)

(52) U.S. Cl.
CPC .............. *G01V 1/303* (2013.01); *G01V 1/306* (2013.01); *G01V 2210/47* (2013.01); *G06F 17/14* (2013.01)

(58) Field of Classification Search
CPC ....... G01V 1/303; G01V 1/305; G01V 1/306; G01V 1/30; G01V 1/32; G01V 1/325; G01V 1/36; G01V 1/28; G01V 1/282; G01V 1/40; G01V 1/50; G01V 2210/40; G01V 2210/47; G06F 17/10; G06F 17/14
See application file for complete search history.

(56) References Cited

U.S. PATENT DOCUMENTS

| | | | |
|---|---|---|---|
| 2005/0261835 A1* | 11/2005 | Wang | 702/6 |
| 2010/0085835 A1* | 4/2010 | Tang et al. | 367/32 |
| 2010/0128563 A1 | 5/2010 | Strobbia et al. | |

FOREIGN PATENT DOCUMENTS

| | | |
|---|---|---|
| WO | WO 2009/120401 | 10/2009 |
| WO | WO 2009/120402 | 10/2009 |
| WO | WO 2010/019314 | 2/2010 |
| WO | WO 2010/062836 | 6/2010 |
| WO | WO 2010/086409 | 8/2010 |

OTHER PUBLICATIONS

Baumstein, A. et al. (2011), "Simultaneous source elastic inversion of surface waves," 73$^{rd}$ EAGE Conference and Exhibition, 5 pgs.

(Continued)

*Primary Examiner* — Manuel L Barbee
(74) *Attorney, Agent, or Firm* — ExxonMobil Upstream Research Company Law Dept.

(57) ABSTRACT

A method for estimating velocity dispersion in seismic surface waves in massive 3-D data sets (401) that improves upon auto-picking of a curve along the peak or ridge of the magnitude of the beam-formed field (402). The seismic data are transformed to the frequency-slowness domain, where nonlinear constrained optimization is performed on the transformed data. The optimization matches a nonlinear mathematical parametric model (403) of a beam-formed field to that in the transformed data, adjusting the parameters each iteration to reduce mismatch (404). Dispersion curves are determined by the center of the beam in the optimized models (405). A preferred nonlinear parametric mathematical model is a Gaussian-shaped beam or a cosine-tapered boxcar beam.

13 Claims, 6 Drawing Sheets

(56) References Cited

OTHER PUBLICATIONS

Foti, S. (2004), "Surface Wave Testing for Geotechnical Characterization," CISM, Sep. 6-10, 2004, 75 pgs.

Hermann, R.B. (2002), "Computer programs in seismology, Surface waves, Receiver Functions and Crustal Structure," distributed by Earth and Atmospheric Sicences, St. Louis University, program documentation, pp. 3-23-3-35.

Lee, S. et al. (2008), "3-D mitigation of surface-wave noise in a spatially inhomogenous media," SEG Las Vegas 2008 Annual Meeting, pp. 2561-2565.

Li, M. (2000), "Seismic Applications of Interactive Computational Methods," Thesis, The Department of Geosciences, University of Sydney, 121 pgs.

Park, C.B et al. (2007), "Multichannel analysis of surface waves (MASW)—active and passive methods," *The Leading Edge*, pp. 60-64.

\* cited by examiner

DISPERSION ESTIMATION BY NONLINEAR OPTIMIZATION OF BEAM-FORMED FIELDS

CROSS-REFERENCE TO RELATED APPLICATION

This application claims the benefit of U.S. Provisional Patent Application 61/499,546, filed Jun. 21, 2011, entitled IMPROVED DISPERSION ESTIMATION BY NONLINEAR OPTIMIZATION OF BEAM-FORMED FIELDS, the entirety of which is incorporated by reference herein.

FIELD OF THE INVENTION

This invention relates generally to the field of geophysical prospecting and, more particularly, to seismic data processing. Specifically, the invention is an improved method for velocity dispersion estimation for seismic surface waves.

BACKGROUND OF THE INVENTION

Seismic surface waves are often measured in exploration seismic survey in land or shallow-water environment. These surface waves typically exhibit dispersion, a physical phenomenon where different frequency components of the waves propagate at different speeds. Estimation of velocity dispersion is essential to noise mitigation and shallow earth characterization. In shallow earth seismic propagation, dispersion results from the fact that different frequencies probe to different depths in the near surface of the earth, and in a characteristically layered earth the velocities of deeper sediments are higher than the velocities of the sediments right near the earth's surface. By characterizing dispersion, the surface waves that travel along the earth's near surface can be characterized. Since such surface waves almost always represent undesirable noise in seismic data, surface-wave characterization permits the accurate removal of such noises. Surface-wave characterization also permits the determination of local earth properties in the vicinity of a seismic survey (Lee and Ross, 2009, WO 2009/120401 A1 and WO 2009/120402 A1; Park, et al. 2007).

The general methods of surface-wave characterization include:

Multi-channel analysis of surface waves ("MASW") for local, site-specific analysis—permits detailed analysis and signal processing on data (Park, et al. 2007).

For larger quantities of data, covering larger areas, or involving massive 3-D seismic surveys, there is a need for some automation and integration of estimation, quality control, visualization and mapping. Global seismology is an intermediate case between local, site-specific data analysis and massive 3-D seismic surveys, but data sets are still small enough to be mostly hand interpreted with the aid of analysis software (Herrmann, R. B., 2002) and visualization. The end member in terms of methods to deal with massive 3-D seismic surveys is represented by Lee and Ross (2009, WO 2009/120402 A1), where the surface wave velocity V is estimated as a function of two spatial coordinates x and y, and frequency f.

Other methods are more complete in the formalization of the inversion, such as that of Krohn (2010), Strobbia and Glushchenko (2010) and Baumstein, et al., (2011) using various forms of approximate or full-wave inversion to derive either dispersion properties (Krohn, Strobbia and Glushchenko) or earth properties (Baumstein, et al.).

Technical Problem Addressed

Among the methods for massive datasets in 3-D, Lee and Ross (2009, WO 2009/120401 A1 and WO 2009/120402 A1) disclose methods of pre-analysis, data QC, derivation of parameters essential for dispersion estimation, estimation of dispersion volumes (V(x, y, f)) and use of them for characterizing and mitigating noise in seismic data.

Figure 1:
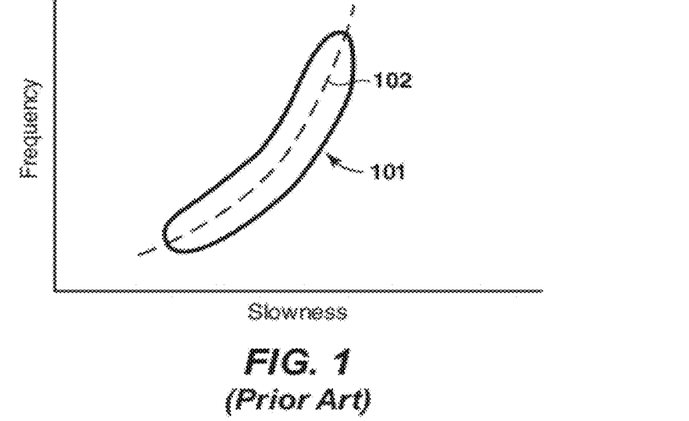
FIG. 1 illustrates a beam-formed field B(x, y, f, s), with peak picked to derive the dispersion curve.

Among the methods available to derive a dispersion volume is to derive a dispersion estimate V(x, y, f) from beam-formed fields, B(x, y, f, s) or panels of slowness (inverse of velocity, denoted by s) vs. frequency. The beam-formed field B(x, y, f, s) is a local computation of the spectral properties of the data in the vicinity of a region of interest. It is a re-mapping of the 2-D Fourier (temporal frequency, spatial frequency) domain to the temporal frequency, velocity domain. For a 2D example, let D(x,t) be a gather of the seismic data for a common reflection point, where x is the offset (offset is source-receiver separation), and t represents travel time from source to receiver, a surrogate for the depth of the reflector. Then apply a 2-D Fourier transform that transforms t→f and x→k, where f is frequency and k is wave number, which is $2\pi f/v$, where v is velocity. From this representation, panels of cross-plots of the data, f vs. k, can be formed. The k-coordinate can then be divided by $2\pi$ times frequency and becomes slowness, s, the reciprocal of velocity. The division by frequency means that the data are irregularly sampled in the k dimension, and this can be corrected by interpolation. The result is a spread of data caused by limited resolution in the Fourier domain, and this spread is referred to as the beam. The entire transform of t, x to f, s is referred to as the beam-formed field. Deriving the dispersion can be achieved by picking a curve along the peak or ridge of the magnitude of the beam-formed field, as shown in FIG. 1. 101 is the beam under consideration in the beam-formed field B(x, y, f, s) at location (x, y). 102 is the picked dispersion curve from the peak of the beam.

Again, for massive data volumes, this picking must be automated, i.e. performed on a suitably programmed digital computer, because there are far too many such beam-formed fields. Ultimately, the thousands or tens of thousands of dispersion curves thus picked are quality controlled, averaged and formulated into a dispersion velocity volume, V(x, y, f), for further use in noise suppression or other applications of relevance. Lee and Ross (2008), and Lee and Ross, (WO 2009/120401 A1) discuss constraining the automated picking to maximize the likelihood of obtaining a valid estimate.

Figure 2:
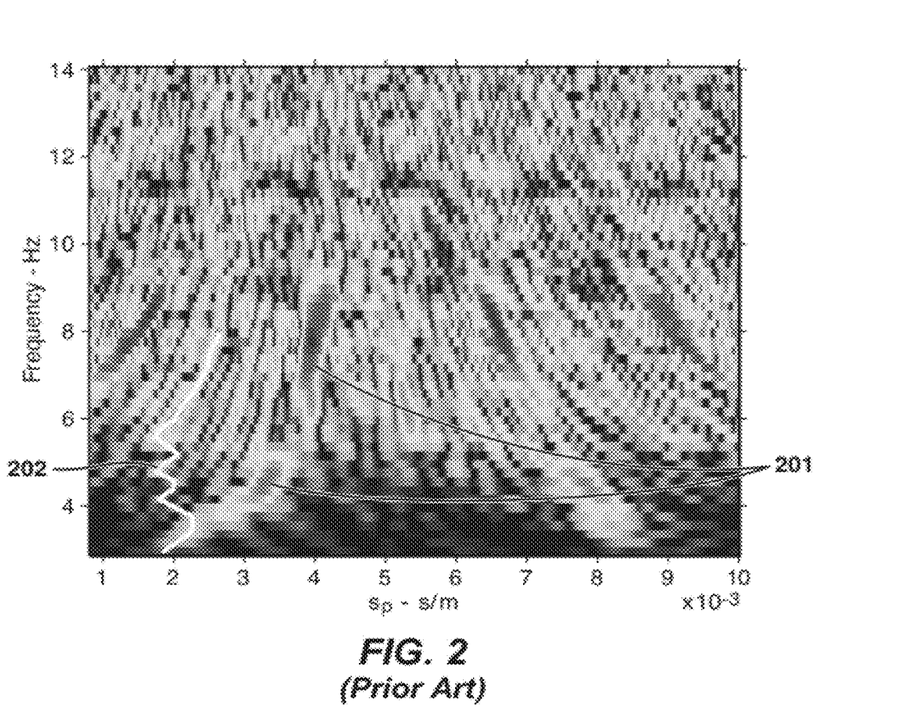
FIG. 2 illustrates a very difficult case of a poorly organized beam in a beam-formed field that permits the auto-picking to go astray and wander off the beam to track nearby noise.

Nonetheless, there are difficult cases, especially in legacy, low-fold (poorly sampled) 3-D seismic data, where such automatic picking is very difficult because there are extraneous noises in the beam-formed field that cause auto-picking to go astray, and/or there are other events or beams (sometimes caused by aliasing in the spectral estimate, sometimes caused by the presence of closely spaced other modes) that make almost any auto-picking constraint or pre-processing data preparation inadequate. Such a case is shown in FIG. 2. 201 is the beam under consideration, which is broken up into two parts and has very low amplitude at its lower end. 202 is the auto-picked curve, which has gone astray onto a neighboring beam, a side lobe of the main beam, or noise.

For intermediate cases, where the picking of the dispersion curve is not too difficult and the picked curves is noisy but not too faulty, Tang et al. (2010) have a method of improving the dispersion curve estimate itself by fitting it to an analytic curve. However, such measures are wholly inadequate for the harder cases under consideration here, where the beam-formed field itself is too deficient and noisy to yield a close enough dispersion curve to be fit by such an analytic curve after the fact.

SUMMARY OF THE INVENTION

In one embodiment, the invention is a method for processing seismic data from a subsurface region to obtain indication of hydrocarbon potential of the subsurface region, comprising:

estimating velocity dispersion of seismic surface waves in the subsurface region by a method comprising transforming the seismic data to frequency-slowness domain, and then performing nonlinear constrained optimization on the transformed seismic data;

using the estimated seismic velocity dispersion in processing the seismic data or in determining local earth properties in the subsurface region; and using the processed seismic data or the local earth properties for determining presence, quality or other characteristic of hydrocarbon reservoirs.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DETAILED DESCRIPTION OF EXAMPLE EMBODIMENTS

Figure 3:
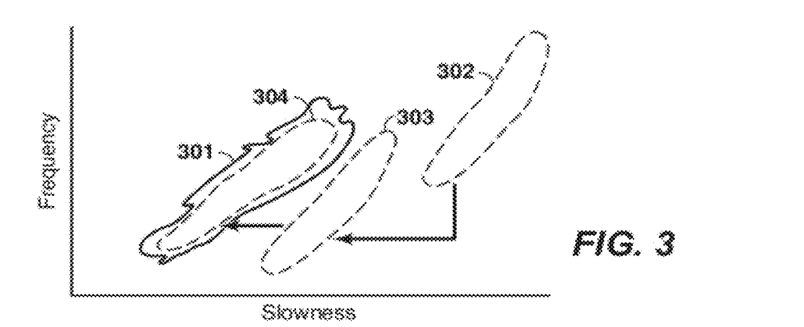
FIG. 3 illustrates a beam-formed field fit by an analytic dispersion beam by nonlinear optimization.

For the harder cases discussed in the "Background" section, the present invention is a method that involves modeling the beam-formed field itself with analytic dispersion beams, then fitting the beam-formed field with the analytic beam by nonlinear optimization. See FIG. 3. In this figure, 301 is the noisy beam that is to be fit by a model beam. 302 is a possible analytic beam with incorrect parameters, possibly a starting model beam for the iterative nonlinear optimization. 303 is the analytic beam on a later iteration of the optimization, in which it has moved closer to the beam being fit. 304 is the analytic beam on a still later iteration, in which it fits the actual beam very well.

Once the beam is fit to the beam-formed field data, the trajectory in frequency-slowness space corresponding to the center or ridge of the beam is used as a dispersion relation in place of any auto-picked curve from the original beam-formed field data.

Figure 4:
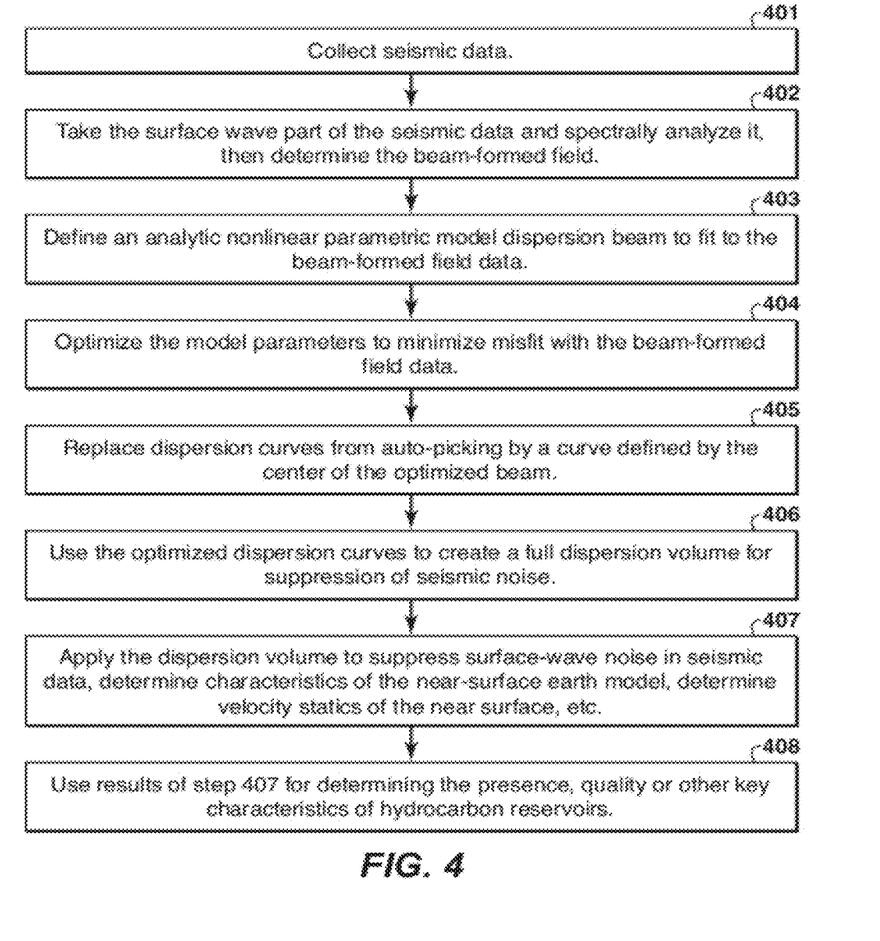
FIG. 4 is a flowchart showing basic steps in one embodiment of the present inventive method.

FIG. 4 is a flow chart showing basic steps in one embodiment of the present inventive method. After collecting seismic data and organizing it into seismic raw records for analysis in step 401, the raw beam-formed field is computed in step 402. This step comprises organizing the collected seismic data into records for such analysis, and then computing the beam-formed field by spectrally analyzing those records. Surface waves often appear as readily observable high-amplitude arrivals in the seismic record. The data for step 402 may be obtained by windowing the data around a wave of interest. These seismic data are then spatially windowed to form an array. The data in the array are weighted by their spatial location, and this weighting function is referred to as the array taper function. The taper function has lower values in the area near the edges of the array. The beam-formed field is then computed as spatio-temporal Fourier transform of the data in the tapered array. Next, at step 403, an analytic dispersion beam characterized by a specific mathematical formula is defined. At step 404, that analytic beam optimized to best fit the actual beam, which comprises choosing a starting model, an optimization scheme, then performing the optimization to determine the best fit parameters of the analytic beam to fit the data. Next, at step 405, the dispersion curve corresponding to the center of the best-fit analytic beam is used instead of a dispersion curve found by auto-picking. Alternatively, auto picking may be used on the data in a good-data-quality region, with the present invention being used in the troubled areas. At steps 406-408, further processing may be performed with the newly optimized dispersion relations.

In step 406, the replacement dispersion curves may be used to define the curve for further processing in creating a full dispersion volume for suppression of seismic noise or other applications such as determining characteristics of the near-surface earth model. In step 407, the full dispersion volume from step 406 may be used to suppress surface-wave noise in seismic data, determine characteristics of the near-surface earth model, determine velocity statics of the near surface (i.e., determine the travel time of seismic waves through the near surface by calculating D/V of each location, where D is the thickness of the near surface layer and V is velocity), and for other purposes. In step 408, the improved seismic data and/or knowledge of the near-surface earth model, or the velocity statics may be applied in further processing to produce interpretable seismic images and other products for determining the presence, quality or other key characteristics of hydrocarbon reservoirs, thereby improving success in hydrocarbon exploration, development or production.

Several formulae are possible for the analytic shape of the beam, but for illustrative purposes, the Gaussian-shaped beam will do (others, like a cosine-tapered boxcar, are easily envisioned and implemented). Alternatively, one may compute the shape of the beam to be the spatial Fourier transform of the array taper function used for beam-forming, which was described above in step 402. The formula for any of these types of beams is $$B(f, s) = \begin{cases} A(f, s)\exp-(V^{-1}(f, p_1, p_2, p_3, p_4, \ldots) - s)^2 / \sigma^2] & f_{min} \le f \le f_{max} \\ 0 & \text{otherwise} \end{cases}.$$

The beam is characterized by several parameters: a frequency range over which it is active ($f_{min} \le f \le f_{max}$), a width $\sigma$, and a trajectory in slowness frequency $V^{-1}(f, p_1, p_2, p_3, p_4 \ldots)$ that represents the beam's ridge or peak (i.e., the dispersion curve for the beam), and the beam's amplitude A(f, s). This trajectory is a function of several parameters $p_i$. The beam that best fits the beam-formed field may be determined by gradient or other optimization methods applied to all the above parameters. Realistically, however, the beam's active range of frequencies may be preferably pre-determined to avoid breaks in B(f, s) as displayed in FIG. 2. Therefore, to set the proper range, some prior knowledge and data analysis may be required for such embodiments of the invention. Similarly, prior knowledge is preferably required to set the width of the beam, although this latter quantity is intimately related to the size of the spatial analysis window (the size of the array) and can even be determined approximately in advance just with knowledge of the window size. The spatial analysis window, in turn, is shown in Lee and Ross 2009, (WO 2009/120401 A1) to be properly a consequence of correlation analysis. An alternative to both of the aforementioned approaches is to make the determination of the active frequency range and the width a part of the optimization. The amplitude of the beam, A(f, s), can be determined in several possible ways, among which are: (1) It can be set as a scalar value, either to be determined in the optimization or predetermined by analysis of the magnitude of the beam in the beam-formed field. (2) It can be determined to be the spatial Fourier transform of the array taper function. (3) It can be determined by the method described in the preferred embodiment described next. A(f, s) is the quantity in the expression above that will depend upon the choice of the analytic shape of the beam, i.e. whether it is Gaussian or some other shape.

One preferred embodiment of the present invention can be outlined as follows:
  A Gaussian-shaped beam with pre-determined and fixed frequency range and width is used.
  V (f, $p_1, p_2, p_3, p_4, \ldots$ )=a+b/(1+exp[−d (f−c)])$^{-1}$. a and b are scalar shifts, c is the central frequency of the active range, and d and n control the rate of change of the trajectory around the central frequency. This functional form is not arbitrary. It has very favorable, physically correct properties with respect to the relationship of the group and phase velocity of the dispersive wave. In particular, the group velocity should be asymptotic to the above phase velocity trajectory ($V^{-1}$(f, $p_1, p_2, p_3, p_4, p_5 \ldots$ ) is a phase velocity) at the low and high ends of the spectrum. Other, slope-based, properties are also satisfied, which put the above velocity trajectory in a limited class of functions that could represent a physically realistic phase-velocity trajectory.
  The parameters a, b, c, d, and n are the targets of the optimization.
  Gradient optimization is used, based on analytic derivatives of V(f, a, b, c, d, n) with respect to the five parameters.

A(f,s) is determined by the actual amplitude of B(f,s) underneath the beam, i.e. instead of being constant or some analytically variable value, it is controlled by the data. In other words, optimization is performed for the beam location only, and the amplitude is extracted from the amplitude of the original beam-formed field under the beam at the new location.

Although only a single dispersion beam has been discussed so far, all of what is said above applies to optimizing more than one dispersion beam. Dispersive wave fields exhibit multiple modes of dispersion, and over and above that, other types of dispersive waves (such as channelized waves) may be combined with the main one under consideration in the beam-formed field. The above described invention encompasses simultaneously optimizing beams for each of these dispersive beams. The optimization can be performed with or without constraints on the relationship between the several beams. For example, there is a definite relationship between the first (fundamental) and second mode of a dispersive surface wave. One approach to performing the optimization is to constrain the two beams to be within some specified tolerance from the theoretically predicted relationship. Another approach is to perform the optimization without such a constraint, although some constraints on the relationship are preferably imposed to avoid the optimization wandering off to latch onto noise. Both of these approaches are viable, and can be used interchangeably. For example, suppose there are three surface-wave beams in the data. Two of them might be optimized in this manner while allowing the third beam to be optimized for a separate, channelized wave independent of these two. Using this approach, multi-mode dispersion relationships can be derived from beam-formed fields. This would be a practical approach when the surface-wave noise of the other modes as well as that of the fundamental mode needs to be removed.

Even though the invention has been described thus far as pertaining to an improved velocity dispersion, it should be observed that once the beam(s) is fit to the data, the amplitude is determined, at least in embodiments where A(f, s) is obtained from the B(f, s) beam-formed field data under the best-fit beam. Therefore, it is possible to extract more from the beam-formed field than just the velocity dispersion. In particular, A(f, s) derived from the data retains all the information about the spectral behavior of the surface waves that was in the raw beam-formed field. Although it may be noisy, with amplitude variations and drop-outs, experience has shown that appropriate averaging and quality control of the spectra that enter into the average produce useful information about the frequency-dependent amplitude behavior of the surface waves as a function of location in a 3-D survey. Since the spectral behavior contains valuable information about the attenuation structure of the medium, it is possible to derive Q or attenuation from analyzing and processing these spectra. Thus, another key attribute of the surface waves and/or the shallow-near surface is available as a by-product of the optimization that is performed in this invention.

If both amplitude and multi-mode optimization of the beam-formed field are included, it is possible to write the complete description of the surface waves in the frequency-slowness domain as $$B_{total}(f,s) = \Sigma_1^n B_i(f,s),$$

where i is the beam or mode number and there are n total beams (including those that are part of a modal structure of a single surface wave(s) and those that represent other, possibly trapped or channelized, waves. Here, each of the beams may be described by the expression for $B_i(f,s)$ above:

$$B_i(f, s) = \begin{cases} A_i(f, s)\exp[-[f - (V_i^{-1}(f, p_{i1}, p_{i2}, p_{i3}, p_{i4}, p_{i5}, \ldots) - s)]^2 / \sigma_i^2] & f_{i,min} \leq f \leq f_{i,max} \\ 0 & \text{otherwise} \end{cases}.$$

where the parameters $p_{i,1}, p_{i,2}, \ldots$, that describe the trajectory are the optimized ones.

The discussion so far has been only of the amplitude of the beam-formed field. However, because the full beam-formed field may be computed as a two-dimensional Fourier spectrum, it has both amplitude and phase. Either or both can be the basis of the optimization, or their equivalents, the real and imaginary parts, can be used for the optimization. Of course, the model above is then augmented to include the phase component and must match the type of data used. Although it increases the parameter space to include both amplitude and phase, including phase may improve convergence of the optimization and/or avoid local minima.

Example

Figure 5:
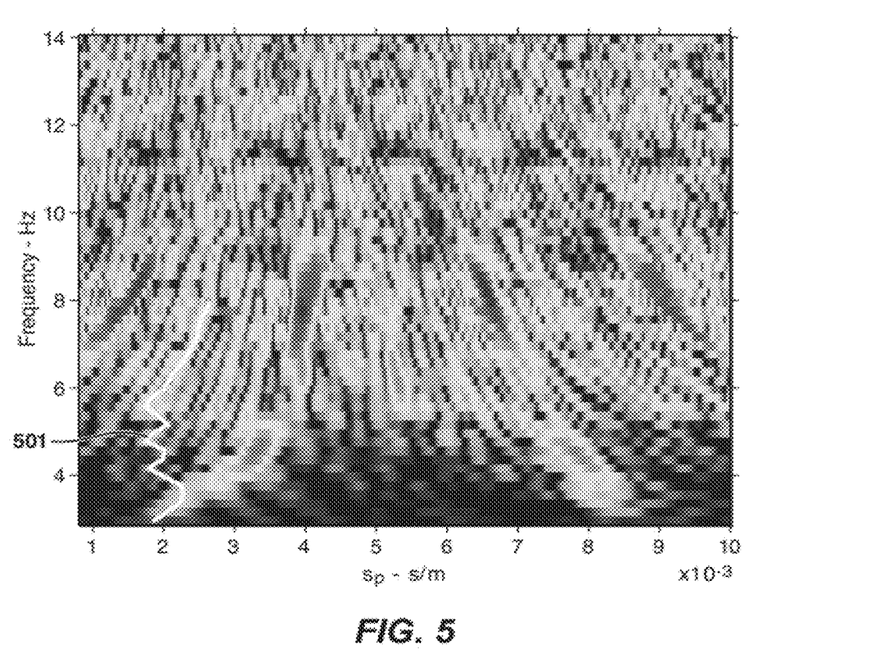
FIG. 5 illustrates a noisy beam-formed field, with auto-picked curve that has gone astray.

FIG. 5 shows a noisy beam-formed field in which an auto-picked dispersion curve 501 has gone astray because of amplitude variations and a broken dispersion beam. Even though the auto-picking algorithm has constraints placed on it with respect to how much of the frequency-slowness space it can occupy and with respect to the relation of one value of the curve to the others, these data are very noisy and therefore the beam-formed field is too noisy and complex for the constraints to keep the auto-picking algorithm on the main beam of interest. Certainly, other, additional, constraints are possible. However, at some point, this burdens the auto-picking algorithm, and especially a user setting parameters and constraints, with so many layers of constraints that another method is needed to obtain the dispersion curve. This is what is accomplished by the invention described herein, the optimized beam of which is shown in FIG. 6.

Figure 6:
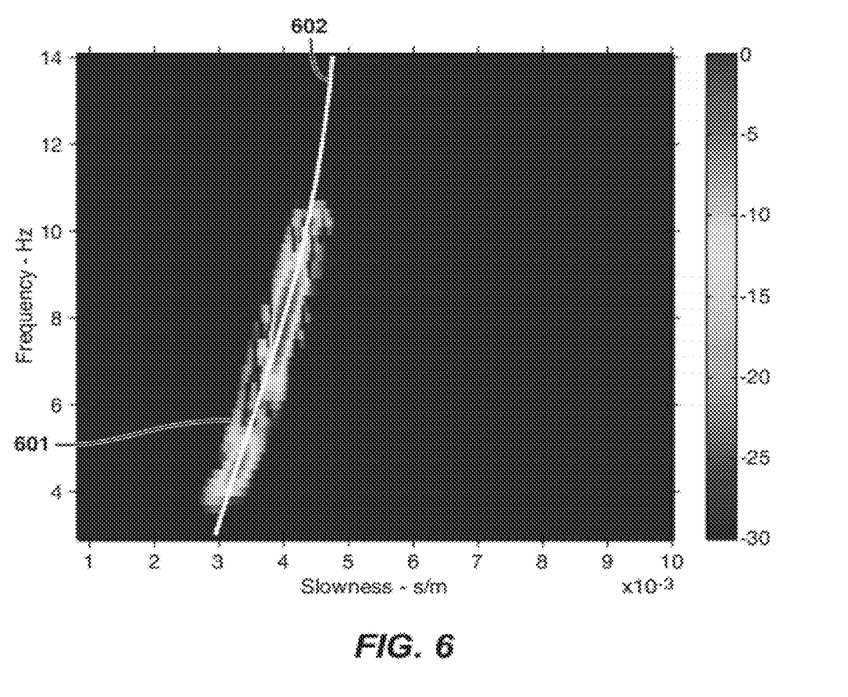
FIG. 6 illustrates an analytic beam fit to the beam-formed field data with its defining trajectory in frequency-slowness space highlighted in white.

FIG. 6 shows the optimized beam 601. Here, a Gaussian-shaped beam with a V(f, . . . ) trajectory described by four parameters, a, b, c and d, is used. The amplitudes of the best-fit beam (A(f, s)) are derived from the amplitudes of the original beam-formed field to which the analytic beam is fit. The optimization has clearly latched onto the beam of interest and stayed on that beam, despite the amplitude variations and the gap in the beam. The white curve 602 is the trajectory of the center of the best-fit beam.

Figure 7:
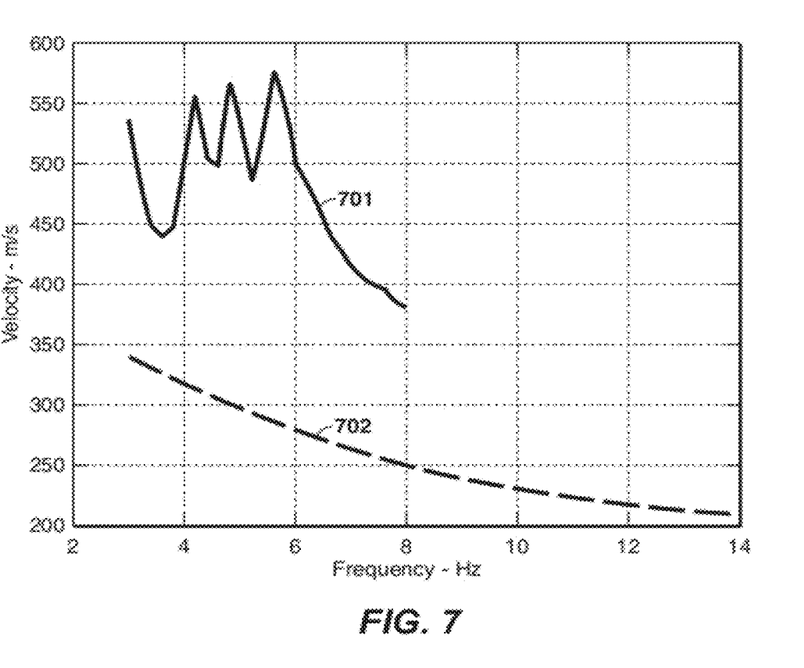
FIG. 7 shows two curves, one defining the trajectory of an auto-picked curve and the other being a curve obtained from the ridge of the optimized beam.
Figure 8A:
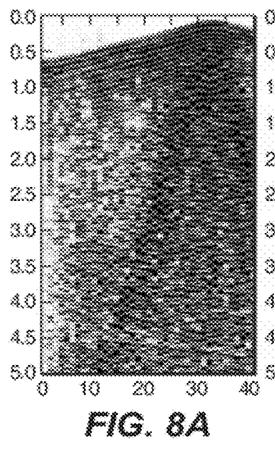
FIGS. 8A-8F show the consequences of using each of the two curves from FIG. 7 in attempting to remove surface-wave noise from seismic data.
Figure 8B:
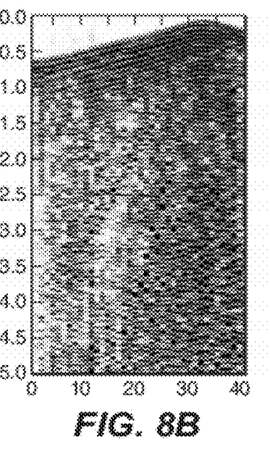
Figure 8C:
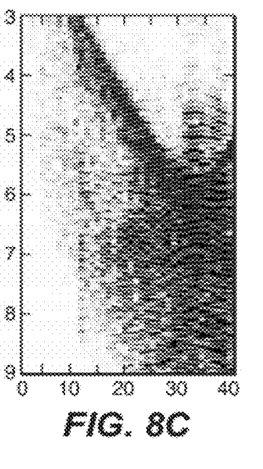
Figure 8D:
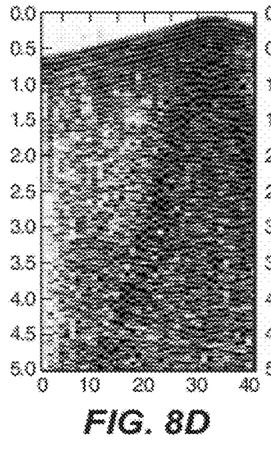
Figure 8E:
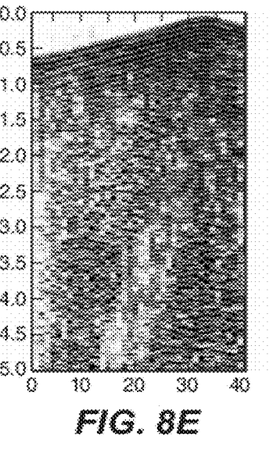
Figure 8F:
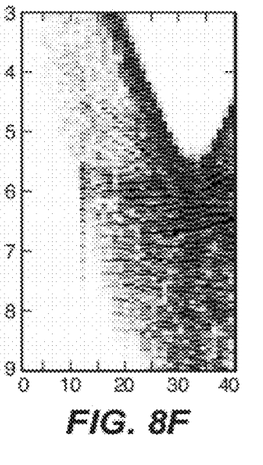

FIG. 7 shows a comparison of the poorly auto-picked curve 701 and the curve 702 derived from the optimized beam. The actual values of the parameters a, b, c and d that characterize the best-fit beam, as derived from the optimization, are amin=525, bmin=−325, cmin=2 and dmin=3.5. They are called amin, bmin, cmin and dmin because they are the parameters that minimize the misfit between the analytic beam and the beam-formed field data. The curve derived from the optimized beam is smooth and decays in an expected manner for a surface-wave, i.e. it is higher at lower frequencies and lower at higher frequencies. As stated above, the group and phase velocity relationships are also physically proper and the group velocity curve (not shown) is of the normal type, with an Airy phase and properly asymptotic to the phase velocity curve with the right slopes on either side of the Airy phase.

The impact of the two curves on surface-wave noise mitigation, shown in FIG. 8, is dramatically different. FIGS. 8A-8C apply to the original, poor, auto-picked dispersion curve (501 and 701). FIG. 8A shows the original seismic record with surface-wave noise to be removed. FIG. 8B shows the output of an attempt to remove surface-wave noise using a poor dispersion curve resulting from auto-picking, and FIG. 8C shows the flattened surface-wave noise using the poor curve with the method described in Lee and Ross, WO 2009/120402 A1. The poor curve does not flatten and compress the surface-wave noise, which can be seen by a great deal of move-out or lack of flatness in the noise. It can also be seen that the noise spills up above the "V" where there should be no surface-wave noise. FIGS. 8D-8F apply to the improved dispersion curve obtained from the optimized beam (601 and 702). FIG. 8D is simply a repeat of the original seismic record (FIG. 8A) with surface-wave noise to be removed. FIG. 8E shows the output of surface-wave noise removal, with more successful notching of the noise. FIG. 8F shows the flattened surface-wave noise using the optimized curve with the method described in Lee and Ross, WO 2009/120402 A1. The optimized curve is successful at flattening and compressing the surface-wave noise to a small zone where it can be successfully notched out by filtering or muting.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Baumstein, A., Ross, W. S., and Lee, S., "Simultaneous source elastic inversion of surface waves," 73rd EAGE Conference and Exhibition, 23-26 May 2011, Vienna, Austria (2011).
Herrmann, R. B., "Computer programs in seismology," distributed by Earth and Atmospheric Sciences, St. Louis University, program documentation (2002).
Krohn, C. E., "Removal of Surface-Wave Noise in Seismic Data," PCT Patent Application Publication No. WO 2010/019314.
Lee, S. and Ross, W. S., "Characterizing Spatial Variability of Surface Waves in Seismic Processing," PCT Patent Application Publication No. WO 2009/120401.
Lee, S. and Ross, W. S., "Surface Wave Mitigation in Spatially Inhomogeneous Media," PCT Patent Application Publication No. WO 2009/120402.
Lee, S. and Ross, W. S., "3-D mitigation of surface-wave noise in spatially inhomogeneous media," Society of Exploration Geophysicists," 78th Annual Intl. Meeting, *Expanded Abstracts,* 2561-2565 (2008).
Park, C. B., Miller, R. D., Xia, J., and Ivanov, J., "Multichannel analysis of surface waves (MASW)," *The Leading Edge* 26, 60-64 (2007).

Strobbia, C. L. and Glushchenko, A., "Continuous Adaptive Surface Wave Analysis for Three-Dimensional Seismic Data," U.S. Patent Application Publication No. US2010/0128563.

Tang, X. M., Li, C., Patterson, D. J., "Novel Curve-Fitting Technique for Determining Dispersion Characteristics of Guided Elastic Waves," U.S. Patent Application Publication No. US2010/0085835.

The invention claimed is:

1. A computer-implemented method for processing seismic data from a subsurface region to obtain indication of hydrocarbon potential of the subsurface region, comprising:

estimating velocity dispersion of seismic surface waves in the subsurface region by a method comprising transforming the seismic data to frequency-slowness domain resulting in a beam-formed field, and then modeling the beam-formed field with an analytic dispersion beam and fitting the beam-formed field with the analytic dispersion beam by performing nonlinear constrained optimization;

using the estimated seismic velocity dispersion in processing the seismic data or in determining local earth properties in the subsurface region; and using the processed seismic data or the local earth properties for determining presence, quality or other characteristic of hydrocarbon reservoirs;

wherein at least the nonlinear constrained optimization is performed using a computer, and wherein the estimated seismic velocity dispersion is determined at locations throughout the subsurface region and is compiled, by a computer, into a 3-D dispersion volume, which is used for further processing of the seismic data to remove unwanted surface-wave noise or to characterize near-earth-surface properties.

2. The method of claim 1, wherein the velocity dispersion estimation method further comprises:

presenting the transformed seismic data in velocity panels and identifying one or more beams in cross-plots of frequency versus slowness;

describing each beam by a nonlinear parametric mathematical model that exhibits a physically correct relationship between phase and group velocities;

performing an iterative optimization to adjust the model's parameters to fit the model to a beam identified in the transformed seismic data; and determining a velocity dispersion relationship from the fitted model.

3. The method of claim 2, wherein the nonlinear parametric mathematical model is a Gaussian-shaped beam or a cosine-tapered boxcar beam.

4. The method of claim 2, wherein the nonlinear parametric mathematical model is computed to be a spatial Fourier transform of an array taper function.

5. The method of claim 2, wherein the nonlinear parametric mathematical model is based on a trajectory defining the beam's center that is an analytic expression involving one or more parameters determining the beam's location and size in the frequency-slowness domain.

6. The method of claim 5, wherein the one or more parameters include beam velocity range, center frequency and rate of change with frequency around the center frequency, and beam size in terms of beam width and overall extent in frequency.

7. The method of claim 5, wherein all of said location and size parameters characterizing the trajectory of the beam are optimized in the nonlinear constrained optimization.

8. The method of claim 5, wherein one or more of said location and size parameters characterizing the trajectory of the beam are pre-determined by analysis and held fixed in the nonlinear constrained optimization.

9. The method of claim 2, wherein characteristics of spectral amplitudes of the optimized model beam or beams are used to analyze or estimate useful spectral properties of surface-waves or a shallow near-surface portion of the subsurface region.

10. The method of claim 9, wherein said useful spectral properties comprise Q or attenuation structure.

11. The method of claim 2, wherein the transformed seismic data and the nonlinear parametric mathematical model consist of amplitude information, or phase information, or both.

12. The method of claim 1, wherein the seismic data with unwanted surface-wave noise removed or the characterization of near-earth-surface properties are used to improve a seismic image of the subsurface region.

13. A computer program product, comprising a non-transitory computer usable medium having a computer readable program code embodied therein, said computer readable program code adapted to be executed to implement a method for estimating velocity dispersion of seismic surface waves from seismic data representing a subsurface region, said method comprising transforming the seismic data to frequency-slowness domain, and then performing nonlinear constrained optimization on the transformed seismic data, wherein the nonlinear constrained optimization comprises:

forming velocity panels from the transformed seismic data, and identifying one or more beams in cross-plots of frequency versus slowness;

describing each beam by a nonlinear parametric mathematical model that exhibits a physically correct relationship between phase and group velocities;

performing an iterative optimization to adjust the model's parameters to fit the model to a beam identified in the transformed seismic data; and determining a velocity dispersion relationship from the fitted model, wherein the velocity dispersion relationship is used to determine velocity dispersion at locations throughout the subsurface region and is compiled, by a computer, into a 3-D dispersion volume, which is used for further processing of the seismic data to remove unwanted surface-wave noise or to characterize near-earth-surface properties.

* * * * *